(12) United States Patent
Catoen et al.

(10) Patent No.: US 6,214,275 B1
(45) Date of Patent: Apr. 10, 2001

(54) INJECTION NOZZLE AND METHOD FOR INJECTION MOLDING

(75) Inventors: Bruce Catoen, Georgetown; Rajan Puri, Mississauga, both of (CA)

(73) Assignee: Husky Injection Molding Systems Ltd. (CA)

( * ) Notice: Subject to any disclaimer, the term of this patent is extended or adjusted under 35 U.S.C. 154(b) by 0 days.

(21) Appl. No.: 09/325,895

(22) Filed: Jun. 4, 1999

(51) Int. Cl.$^7$ .................................................. B29C 45/23
(52) U.S. Cl. ...................... 264/328.9; 264/334; 425/556; 425/564; 425/566
(58) Field of Search ........................... 425/556, 562, 425/563, 564, 565, 566; 264/328.9, 334

(56) References Cited

U.S. PATENT DOCUMENTS

| | | |
|---|---|---|
| 2,828,507 | 4/1958 | Strauss . |
| 3,671,159 | 6/1972 | Greenberg et al. . |
| 4,416,608 | 11/1983 | Deardurff . |
| 4,588,370 | 5/1986 | Ichizawa et al. . |
| 4,820,467 | 4/1989 | Ehrler et al. . |
| 5,346,659 | 9/1994 | Buhler et al. . |
| 5,423,672 | 6/1995 | Gordon . |
| 6,074,191 | * 6/2000 | Gellert et al. ........................ 425/564 |

FOREIGN PATENT DOCUMENTS

| | | |
|---|---|---|
| 52-151358 | 12/1977 | (JP) . |
| WO 94/14591 | 7/1994 | (WO) . |
| WO 99/22926 | 5/1999 | (WO) . |

OTHER PUBLICATIONS

Patent Abstracts of Japan, vol. 16, No. 464 (M–1316), Sep. 28, 1992 & JP 04 164618 (Mitsubishi Material Corp), Jun. 10, 1992.

* cited by examiner

Primary Examiner—Tim Heitbrink
(74) Attorney, Agent, or Firm—Bachman & LaPointe, P.C.

(57) ABSTRACT

A valve stem is mounted in a nozzle body, with the valve stem moving from an open position retracted from the injection orifice permitting the flow of resin to the mold cavity, to a closed position blocking the injection orifice and preventing the flow of resin to the mold cavity, and to an advanced position within the gate nub area to assist in the ejection of a molded part and clear the gate nub area.

12 Claims, 3 Drawing Sheets

INJECTION NOZZLE AND METHOD FOR INJECTION MOLDING

BACKGROUND OF THE INVENTION

When injection molding plastic preforms, as for example preforms of polyethylene terephthalate (PET), some systems form a gate nub or projection area from the molded part that is allowed to solidify on the molded part and is later removed from the molded part in a subsequent operation. This gate nub or projection is a depository for undesirable resin crystallinity that typically forms in the mold gate area. If the nub is subsequently cut off one has a molded preform which is free of gate crystallinity. Such a system is shown in U.S. Pat. NO. 4,588,370 to Ichizawa et al., patented May 13, 1986.

A second approach is to cause the gate nub to break off the molded part during mold opening and then eject the removed nub from the gate area when the mold is open. This is shown in Japanese Patent Application No. 52-151358, published Dec. 15, 1977. In this procedure the valve stem of a hot runner has a "gate puller" undercut machined into its end so that the gate nub solidifies and forms around the gate puller when the valve stem is in the gate closed position. Then as the mold opens the valve stem is retracted to break off the nub which then appears to fall free of the mold when the mold cavity is moved away from the hot runner system. This considerably complicates mold construction and does not appear to provide a foolproof nub removal and ejection system.

The automatic degating of a sprue is known in other molding applications. U.S. Pat. NO. 4,820,467 to Ehrler et al., patented Apr. 11, 1989, shows a system in which a hot runner molds a cold sprue gated disc. After solidification of the sprue a sleeve surrounding the nozzle tip advances to eject the sprue and degate it from the molded part and simultaneously form a hole therein. The cold, degated sprue is then automatically conveyed away from the gate area down a chute in the mold.

U.S. Pat. NO. 5,346,659 to Buhler et al., patented Sep. 13, 1994, shows another cold sprue gating and ejection system similar to the '467 patent in which the ejection means is built into the top of the mold core.

U.S. Pat. NO. 5,423,672 to Gordon, patented Jun. 13, 1995, shows a molding device for forming a disc with a hole therein. This patent shows a valve gated hot runner in which the valve stem is moved to an intermediate position by means of a dual piston combination. In the disc molding operation the valve stem is first moved forward to open the valve gate and allow resin to fill the mold cavity. Next the valve stem is partially retracted to block the melt flow and allow a lower part of the valve stem to form the hole in the disc. Finally, the valve stem is fully retracted to pull its hole forming section out of the molded part and to allow the molded part to be ejected conventionally from the core side of the mold.

U.S. Pat. NO. 3,671,159 to Greenberg et al., patented Mar. 6, 1970, shows a valve gating system in which the valve stem is hollow and conveys compressed air to assist in ejecting the part as the mold is opened. The valve stem is advanced into the mold cavity to expose the air channel orifice in the valve stem and to allow it to assist in the mold opening and part ejection. A system such as this, however, risks blocking the air passages during injection of the melt while the mold cavity is being filled.

It is a principal object of the present invention to provide an improved injection nozzle system and method for injection molding which includes a movable valve stem and a valve gate nub area.

It is a further object of the present invention to provide a device and method as aforesaid in which the valve stem is conveniently and expeditiously used to advance into the mold cavity-valve gate nub area in order to aid in ejection of the molded part and to clear debris from the valve gate area.

Further objects and advantages of the present invention will appear hereinbelow.

SUMMARY OF THE INVENTION

In accordance with the present invention the foregoing objects and advantages are readily obtained.

The present invention provides an injection nozzle for injection molding plastic resin from a source of molten resin to a mold cavity, which comprises: a mold cavity; an injection nozzle with a nozzle body and a nozzle tip and having an internal flow channel therein communicating with an injection orifice which in turn communicates with said mold cavity for transportation of molten resin to the mold cavity; a valve gate nub area between the mold cavity and injection orifice; a valve stem mounted in the injection nozzle; and means to move the valve stem between an open position retracted from the injection orifice permitting the flow of resin to the mold cavity, a closed position blocking the injection orifice and preventing flow of resin to the mold cavity, and an advanced position within the valve gate nub area to assist in ejection of a molded part and to clear the valve gate nub area. In the preferred embodiment the valve gate nub area includes a passageway between the mold cavity and injection orifice with an annular wall, wherein in the advanced position the valve stem is moved adjacent said annular wall to substantially fill the passageway.

The present invention also provides a method for injection molding resin from a source of molten resin to a mold cavity which comprises: providing an injection nozzle with a nozzle body and a nozzle tip and having an internal flow channel therein communicating with an injection orifice which in turn communicates with a mold cavity; transporting molten resin from said internal flow channel to said mold cavity; positioning a valve gate nub area between the mold cavity and injection orifice; mounting a valve stem in the injection nozzle; and moving the valve stem between an open position retracted from the injection orifice permitting flow of resin to the mold cavity, a closed position blocking the injection orifice and preventing flow of resin to the mold cavity, and an advanced position within the valve gate nub area to assist in ejection of a molded part and to clear the valve gate nub area.

Further features of the present invention will appear hereinbelow.

BRIEF DESCRIPTION OF THE DRAWINGS

The present invention will be more readily understandable from a consideration of the accompanying illustrative drawings showing a preferred embodiment, wherein.

DETAILED DESCRIPTION OF PREFERRED EMBODIMENT(S)

Figure 1:
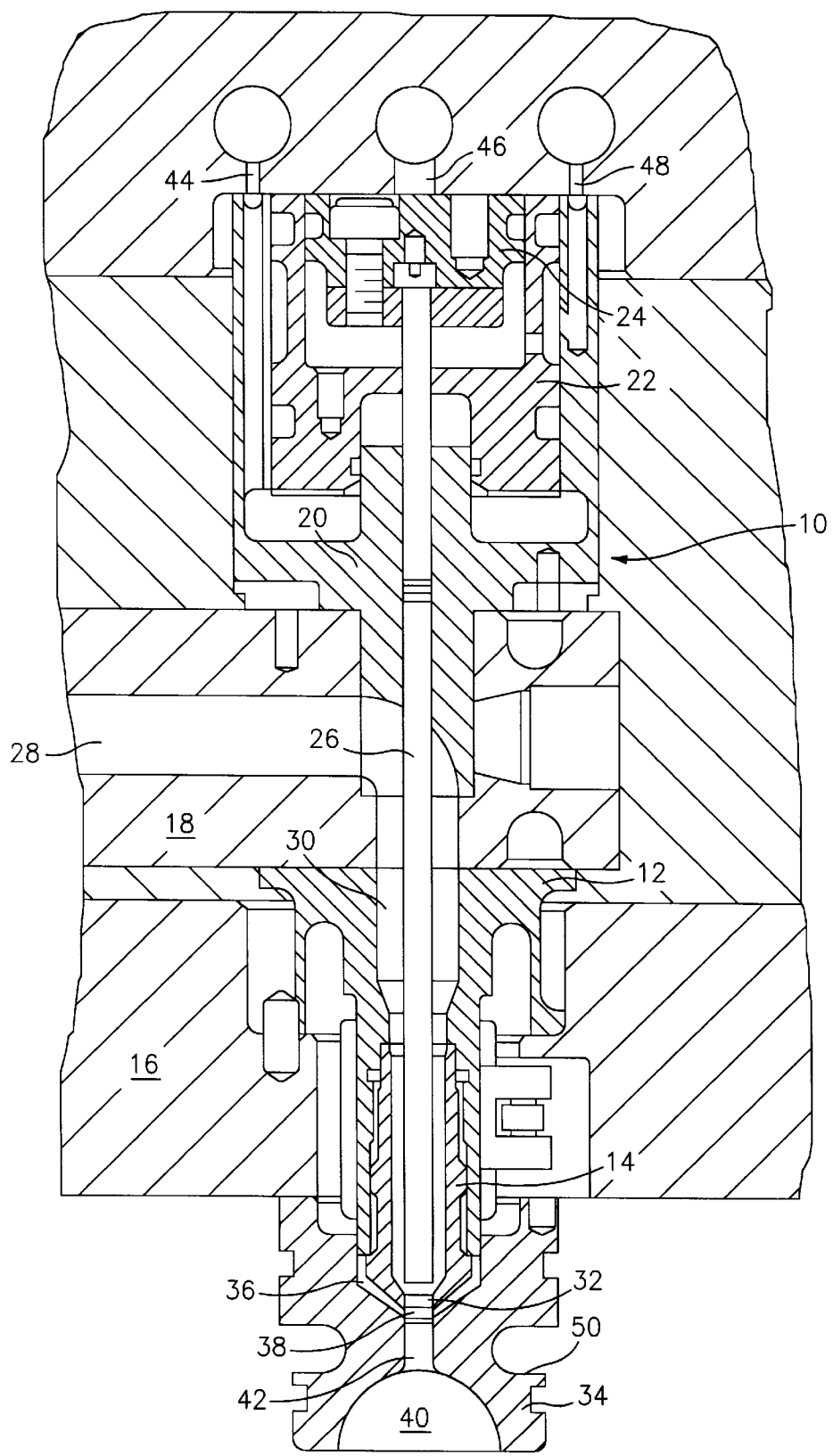
FIG. 1 is a sectional view through a nozzle assembly of the present invention with the valve gate open and the valve stem retracted.
Figure 2:
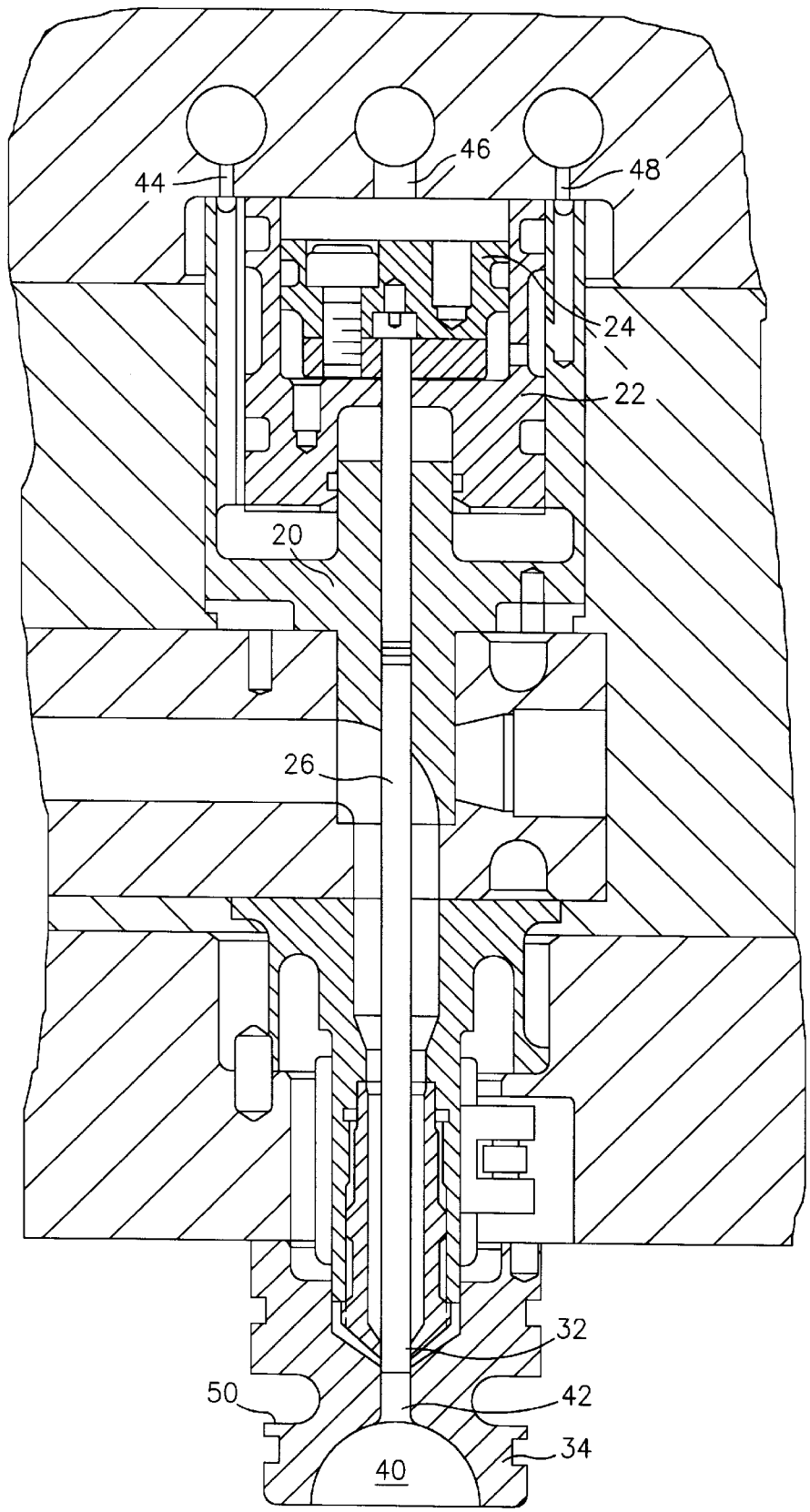
FIG. 2 is a sectional view similar to FIG. 1 with the valve gate closed and the valve stem in the closed position.
Figure 3:
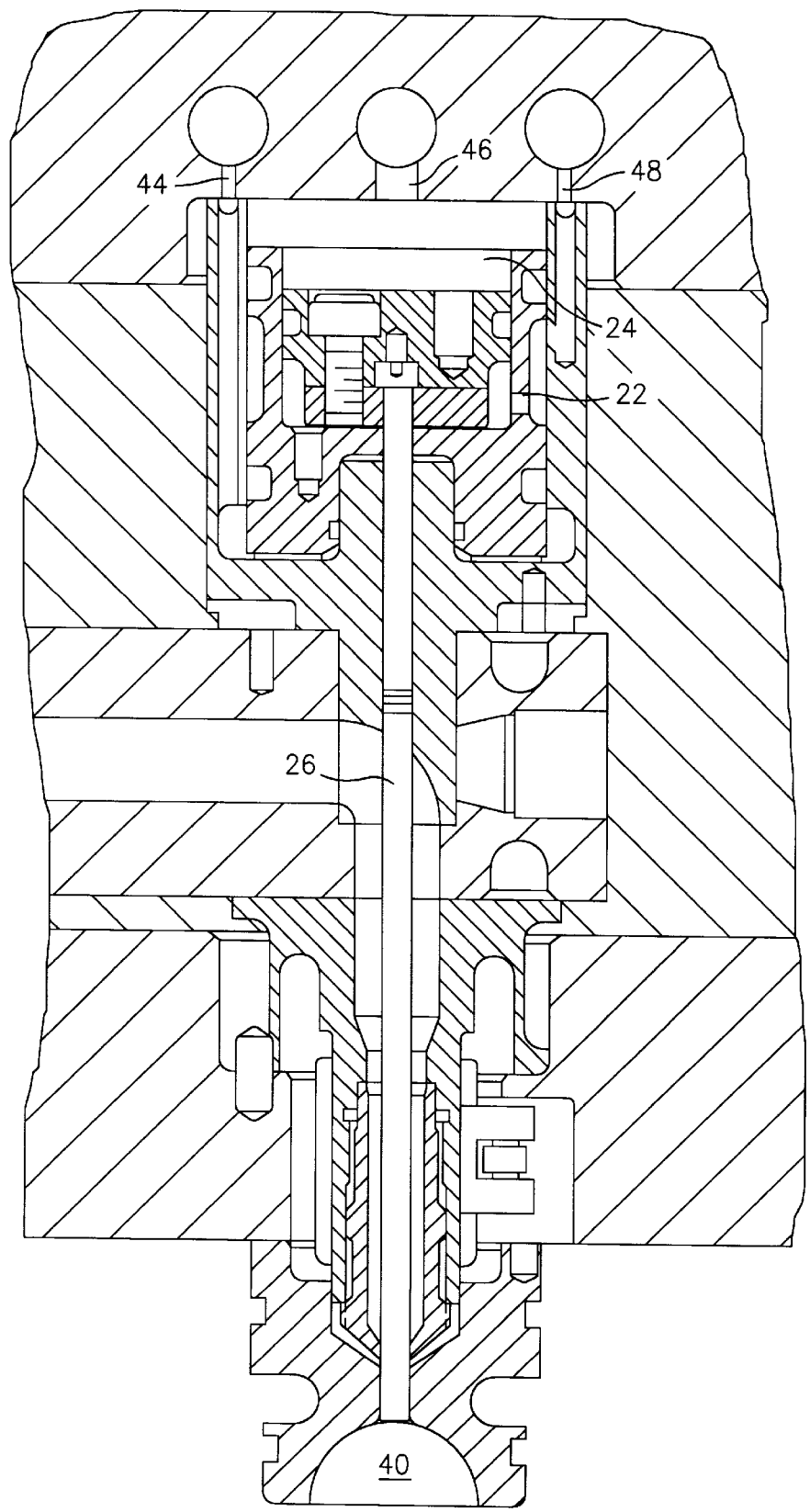
FIG. 3 is a sectional view similar to FIG. 1 with the valve stem in the advanced position.

Referring to the drawings which show a preferred embodiment of the nozzle assembly of the present invention, FIGS. 1–3 show the nozzle assembly in each of three valve stem positions. FIG. 1 shows injection nozzle 10 including nozzle housing 12 and nozzle tip 14 secured thereto. The injection nozzle is located in mold manifold plate 16 and supporting manifold 18. Mounted in manifold 18 is valve bushing 20 that contains two pneumatic pistons 22, 24 to which is attached valve stem 26.

Melt channel 28 in manifold 18 is connected to central melt channel 30 in nozzle housing 12 which in turn leads to injection orifice or gate orifice 32 in gate pad 34. Insulator 36 occupies the space between nozzle tip 14 and gate pad 34 and also contains a melt channel opening 38 therein. When the valve stem 26 is in the fully retracted position as shown in FIG. 1 resin can be injected through the melt channels to fill mold cavity 40 in a known fashion. This mold cavity has a gate nub 42 so that when the mold cavity 40 and nub 42 are filled with resin a molded part is formed having a nub.

Pneumatic pistons 22, 24 are operated by air pressure through lines 44, 46, 48 from a source of compressed air (not shown) such that by directing compressed air appropriately valve stem 26 can be moved to one of three positions. In FIG. 1 both pistons 22 and 24 are fully retracted by compressed air causing both of the pistons to move upward thereby fully retracting valve stem 26 within nozzle housing 12 and permitting resin to flow into the gate nub and mold cavity. Thus, in FIG. 1 compressed air is introduced into line 48 causing piston 24 to retract and is also introduced into line 44 causing piston 22 to retract. This fully retracts valve stem 26.

FIG. 2 shows valve stem 26 in the gate closed position shutting off resin flow to the filled mold cavity 40 and to the filled gate nub 42. The valve stem is moved to the gate closed position shown in FIG. 2 by introducing compressed air into line 44 to maintain piston 22 in the retracted position and also introduced into line 46 to advance piston 46 slightly forward and thus close injection orifice 32. Cooling channels 50 in gate pad 34 cause resin in the mold cavity 40 and gate nub 42 to solidify prior to opening the mold.

FIG. 3 shows valve stem 26 in the advanced position protruding into the gate nub area and thereby assisting in the ejection of the molded part as the mold is opened and also clearing any debris that may have accumulated in the gate nub area. The valve stem is moved to the advanced position shown in FIG. 3 by exhausting air from line 44 to permit piston 22 to move forward and introducing compressed air into line 46 to move both pistons 22 and 24 forward.

Debris can accumulate in front of the valve stem in the nub from a variety of causes such as; the stem is opened too soon by the operator in the process; or a short shot is molded (a partially filled cavity) wherein the partial molding sticks in the cavity and cannot be ejected normally from the core side of the mold; or if during maintenance the stem is operated manually dislodging frozen plastic in the area; or plastic may leak around the side of the stem and partially solidify in the nub area. By advancing the valve stem 26 in accordance with the present invention as shown in FIG. 3, prior to restarting, any such leakage or drool can be easily and conveniently pushed away from the gate area thereby completely clearing the gate area for a smooth restart of the molding operation.

Thus, the present invention provides a simple and expeditious three position hot runner valve stem that can advance the valve stem into the mold cavity nub area to assist in part ejection during mold opening and also to clear debris from the area.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An injection nozzle for injection molding resin from a source of molten resin to a mold cavity, which comprises:
    a mold cavity;
    an injection nozzle having a nozzle body and a nozzle tip and having an internal flow channel therein communicating with an injection orifice which in turn communicates with said mold cavity for transportation of molten resin to the mold cavity;
    a valve gate nub area between the mold cavity and injection orifice;
    a valve stem mounted in the injection nozzle; and
    means to move the valve stem between an open position retracted from the injection orifice permitting the flow of resin to the mold cavity, a fully closed position blocking the injection orifice and preventing flow of resin to the mold cavity, and an advanced position past the fully closed position and within the valve gate nub area to assist in ejection of a molded part and to clear the valve gate nub area.

2. An injection nozzle according to claim 1, wherein the valve gate nub area includes a passageway between the mold cavity and the injection orifice with an annular wall, wherein in the advanced position the valve stem is moved adjacent said annular wall to substantially fill the passageway.

3. An injection nozzle according to claim 2, wherein said valve stem has a continuous forward wall which extends completely across said passageway in the advanced position and a continuous annular wall extending therefrom which extends completely within the annular wall of said passageway in the advanced position.

4. An injection nozzle according to claim 1, including at least one piston connected to said valve stem operative to move said valve stem between the open, closed and advanced positions.

5. An injection nozzle according to claim 4, including two of said pistons connected to said valve stem operative to move the value stem between the open, closed and advanced positions.

6. An injection nozzle according to claim 1, wherein said internal flow channel is connected to a hot runner channel.

7. An injection nozzle according to claim 6, including at least three air inlets operative to move said pistons.

8. A method for injection molding, which comprises:
    providing an injection nozzle having a nozzle body and a nozzle tip and having an internal flow channel therein communicating with an injection orifice which in turn communicates with a mold cavity;
    transporting molten resin from said internal flow channel to said mold cavity;
    positioning a valve gate nub area between the mold cavity and injection orifice;
    mounting the valve stem between an open position retracted from the injection orifice permitting the flow of resin to the mold cavity, a fully closed position blocking the injection orifice and preventing flow of resin to the mold cavity, and an advanced position past the fully closed position within the valve gate nub area to assist in ejection of a molded part and to clear the valve gate nub area.

9. A method according to claim 8, including providing a passageway with an annular wall in the valve gate nub area between the mold cavity and injection orifice, and moving the valve stem in the advanced position adjacent said annular wall to substantially fill the passageway.

10. A method according to claim 8, including moving the valve stem with at least one piston between the open, closed and advanced positions.

11. A method according to claim 10, including moving the valve stem with two of said pistons between the open, closed and advanced positions.

12. A method according to claim 8, including connecting said internal flow channel to a hot runner channel.

* * * * *

UNITED STATES PATENT AND TRADEMARK OFFICE
CERTIFICATE OF CORRECTION

PATENT NO. : 6,214,275 B1
DATED : April 10, 2001
INVENTOR(S) : Bruce Catoen et al.

Page 1 of 1

It is certified that error appears in the above-identified patent and that said Letters Patent is hereby corrected as shown below:

Column 4, claim 5,
Line 44, "value" should read -- valve --.

Column 4, claim 7,
Line 48, "claim 6" should read -- claim 5 --; and

Column 6,
After line 5, the following claim should be inserted:

-- 13. A method according to claim 11, including moving said pistons by at least three air channels. --.

Signed and Sealed this

Twentieth Day of November, 2001

Attest:

*Attesting Officer*

NICHOLAS P. GODICI
*Acting Director of the United States Patent and Trademark Office*